US006892722B1

(12) United States Patent
Francies, III et al.

(10) Patent No.: US 6,892,722 B1
(45) Date of Patent: May 17, 2005

(54) GRILLING APPARATUS

(75) Inventors: Sidney E. Francies, III, San Diego, CA (US); Edward Nunez, San Diego, CA (US)

(73) Assignee: San Diego Precast Concrete, Inc., Santee, CA (US)

( * ) Notice: Subject to any disclaimer, the term of this patent is extended or adjusted under 35 U.S.C. 154(b) by 0 days.

(21) Appl. No.: 10/770,598

(22) Filed: Feb. 3, 2004

(51) Int. Cl.[7] ............................. A47J 37/00; F23J 1/00
(52) U.S. Cl. ..................... 126/25 R; 126/9 R; 126/242; 126/245
(58) Field of Search ................................ 126/242–245, 126/9 R, 9 A, 25 R, 8, 25 B, 149; 110/165 R, 110/166, 167; 248/130, 134, 133, 137, 129, 248/138; 220/571, 908, 909

(56) References Cited

U.S. PATENT DOCUMENTS

| | | | | |
|---|---|---|---|---|
| 1,546,194 A | * | 7/1925 | Bornkessel | 126/244 |
| 3,783,855 A | * | 1/1974 | Newinger | 126/25 R |
| 4,054,123 A | | 10/1977 | Corter | |
| 4,090,490 A | * | 5/1978 | Riley et al. | 126/25 R |
| 4,167,175 A | * | 9/1979 | Malafouris | 126/25 C |
| 4,180,050 A | * | 12/1979 | Sizemore | 126/25 A |
| 4,862,792 A | | 9/1989 | Lerma, Jr. | |
| 5,218,950 A | | 6/1993 | Hait | |
| 5,447,096 A | | 9/1995 | Bürge et al. | |
| 5,927,267 A | | 7/1999 | McKenzie | |
| 5,947,007 A | | 9/1999 | O'Grady et al. | |
| 5,960,782 A | | 10/1999 | Clements et al. | |
| 6,012,381 A | | 1/2000 | Hawn | |
| 6,039,039 A | | 3/2000 | Pina, Jr. | |
| 6,125,836 A | * | 10/2000 | Felton, Jr. | 126/25 R |
| 6,182,560 B1 | | 2/2001 | Andress | |
| 6,357,344 B2 | | 3/2002 | O'Grady et al. | |
| 6,394,082 B1 | | 5/2002 | Rhynsburger | |
| 6,539,843 B2 | | 4/2003 | Andress | |
| 6,598,598 B1 | * | 7/2003 | Bratsikas | 126/25 R |

* cited by examiner

*Primary Examiner*—James C. Yeung
(74) *Attorney, Agent, or Firm*—Akin Gump Strauss Hauer & Feld, LLP

(57) ABSTRACT

A grilling apparatus including an ash receptacle and a grill assembly. The grill assembly includes a firebox and at least one support arm connecting the firebox to the ash receptacle for pivotal movement of the grill assembly between a cooking position and a cleaning position. In an alternative embodiment, the grilling apparatus includes two grill assemblies coupled to the ash receptacle for pivotal movement between cooking and cleaning positions.

14 Claims, 6 Drawing Sheets

GRILLING APPARATUS

BACKGROUND OF THE INVENTION

The invention is in the field of charcoal cooking grills and particularly relates to disposal of ashes and other debris resulting from operation of such grills.

It is known in the prior art to provide charcoal cooking grills for permanent installation at parks, campsites or other public sites. The grills are typically provided with a firebox for holding charcoal as well as a grill rack disposed above the firebox on which food being grilled may be supported. Generally, disposal of spent charcoal from a conventional grill is not convenient. Prior to beginning grilling activities, a user is often confronted with the task of disposal of spent charcoal left by a previous user. The previous user may simply be inconsiderate in his failure to dispose of the spent coals, or the previous user may be reticent in handling coals which have not fully cooled. Thus, the subsequent user is confronted with a disposal task which is at least dirty, and, if the coals used by the previous user have not fully cooled, potentially hazardous. There is a need, therefore, for a grilling device, suitable for installation at a public site, which accommodates quick, clean and safe disposal of spent charcoal.

BRIEF SUMMARY OF THE INVENTION

Briefly stated, in a first aspect the invention is a grilling apparatus having enhanced safety and convenience of operation. The grilling apparatus comprises an ash receptacle having a first end, a second end, and a first opening proximate the first end. The grilling apparatus further comprises a grill assembly including a firebox and at least one support arm having a first end and a second end. The first end is connected to the firebox and the second end is pivotally connected to the ash receptacle. The grill assembly is pivotably movable relative to the ash receptacle between a cooking position and a cleaning position.

In a second aspect, the invention is a grilling apparatus having enhanced safety and convenience of operation and comprising an ash receptacle having a first end, a second end, and an opening proximate the first end. The grilling apparatus further comprises first and second grill assemblies. Each grill assembly includes a firebox and at least one support arm having a first end and a second end. The first end is connected to the firebox and the second end is pivotally connected to the ash receptacle. Each grill assembly is pivotably movable relative to the ash receptacle between a cooking position and a cleaning position.

In a third aspect, the invention is a grilling apparatus having enhanced safety and convenience of operation and comprising an ash receptacle having a first end, a second end, and an opening proximate the first end. The grilling apparatus further comprises a grill assembly including a firebox. The grill assembly is connected to the ash receptacle for pivotal movement relative to the ash receptacle between a cooking position and a spill position. In the spill position, the firebox is positioned over the first opening to allow contents of the firebox to fall into the ash receptacle through the first opening under the action of gravity. In the cooking position, the firebox is positioned along a side of the opening and not over the opening.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings two embodiments which are presently preferred. It should be understood, however, that the invention is not limited to the precise arrangements and instrumentalities shown.

In the drawings.

DETAILED DESCRIPTION OF THE INVENTION

Figure 1:
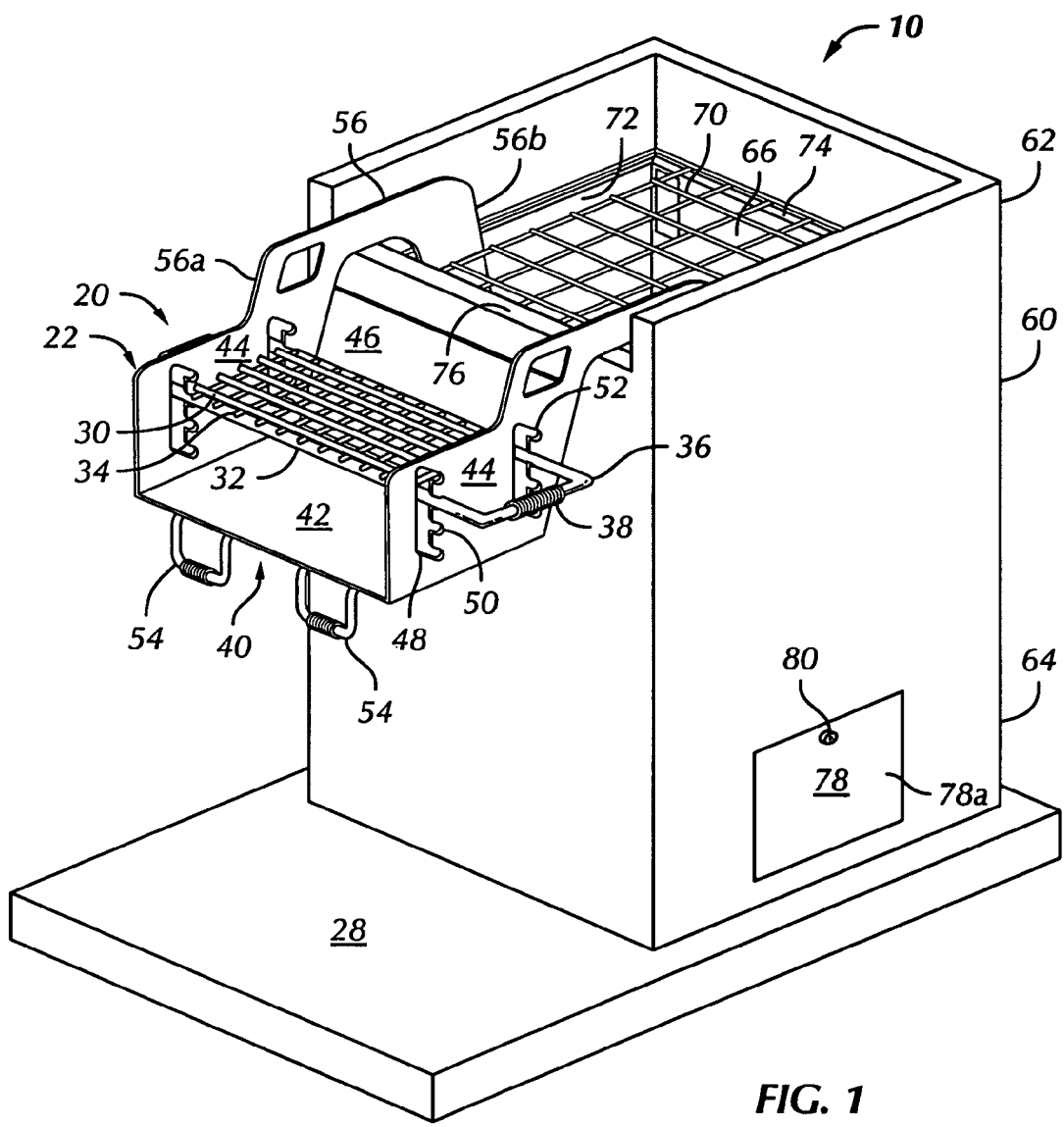
FIG. 1 is a perspective view of a grilling apparatus in accordance with a first preferred embodiment of the present invention, showing a grill assembly in a cooking position.
Figure 2:
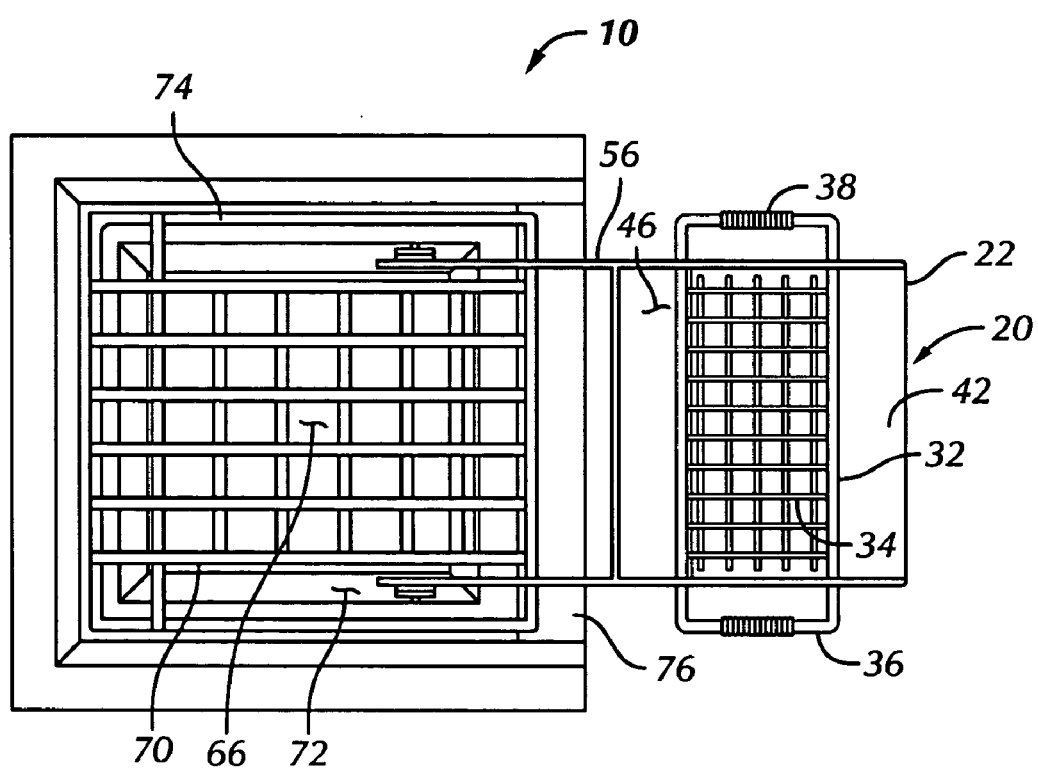
FIG. 2 is a top plan view of the grilling apparatus of FIG. 1.

Certain terminology is used in the following description for convenience only and is not limiting. The words "right", "left", "top", and "bottom" designate directions in the drawings to which reference is made. The words "interior" and "exterior" refer to directions towards and away from, respectively, the geometric center of the apparatus or designated parts thereof. The terminology includes the words above specifically mentioned, derivatives thereof and words of similar meaning.

Figure 3:
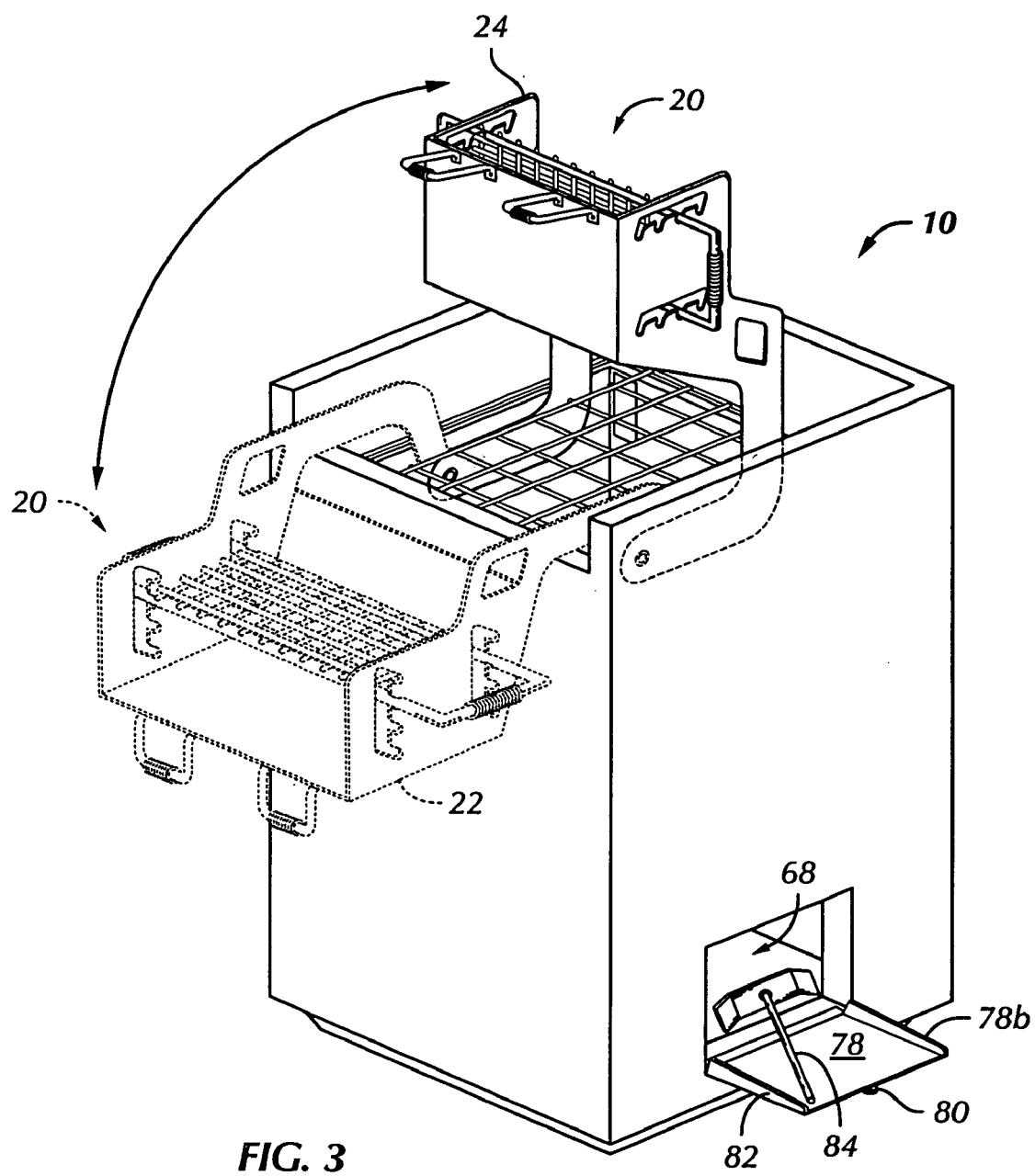
FIG. 3 is a perspective view of the grilling apparatus of FIG. 1, illustrating pivotal movement of the grill assembly between the cooking position and a cleaning position.
Figure 4:
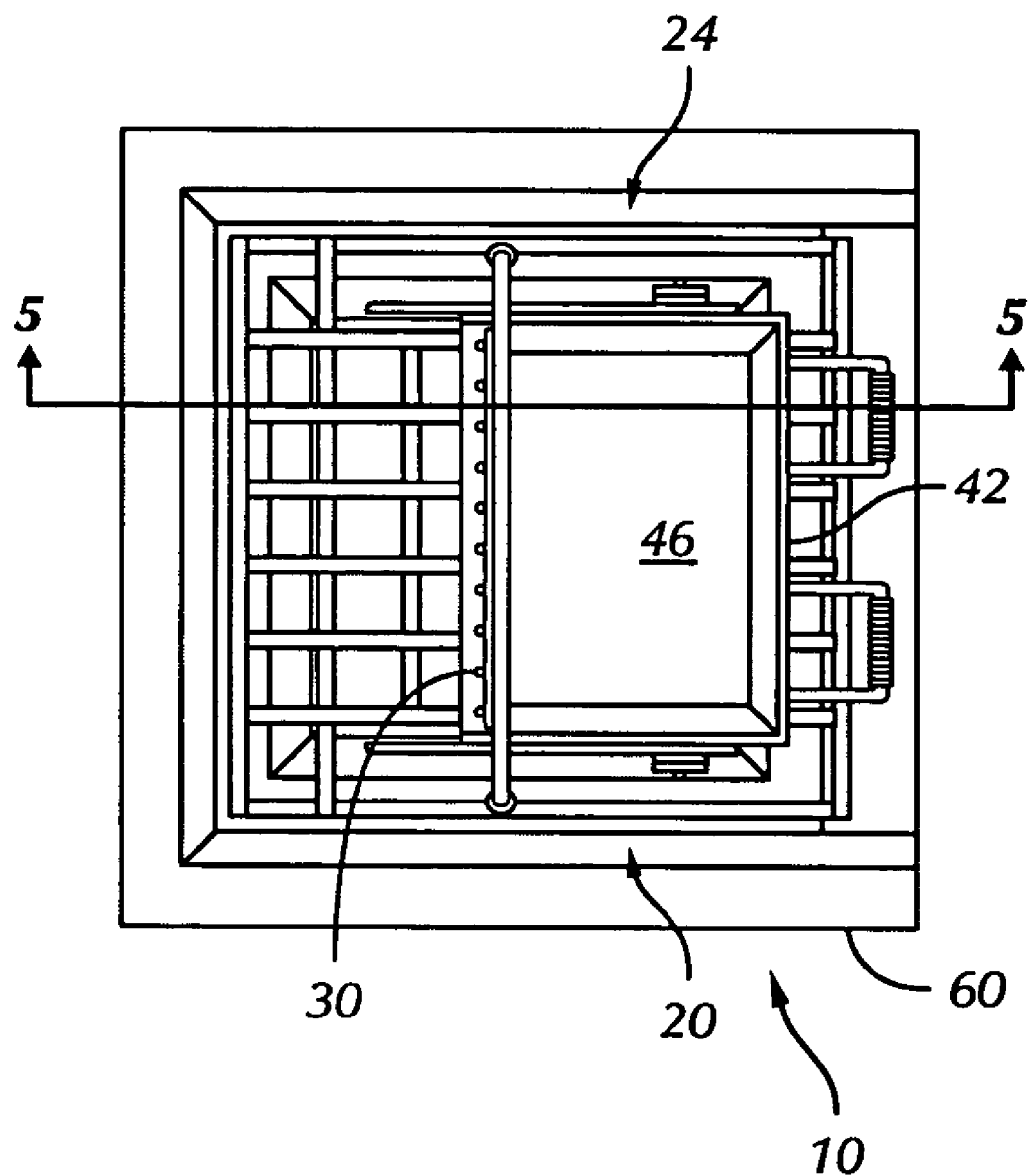
FIG. 4 is a top plan view of the grilling apparatus of FIG. 1, showing the grill assembly in the cleaning position.
Figure 5:
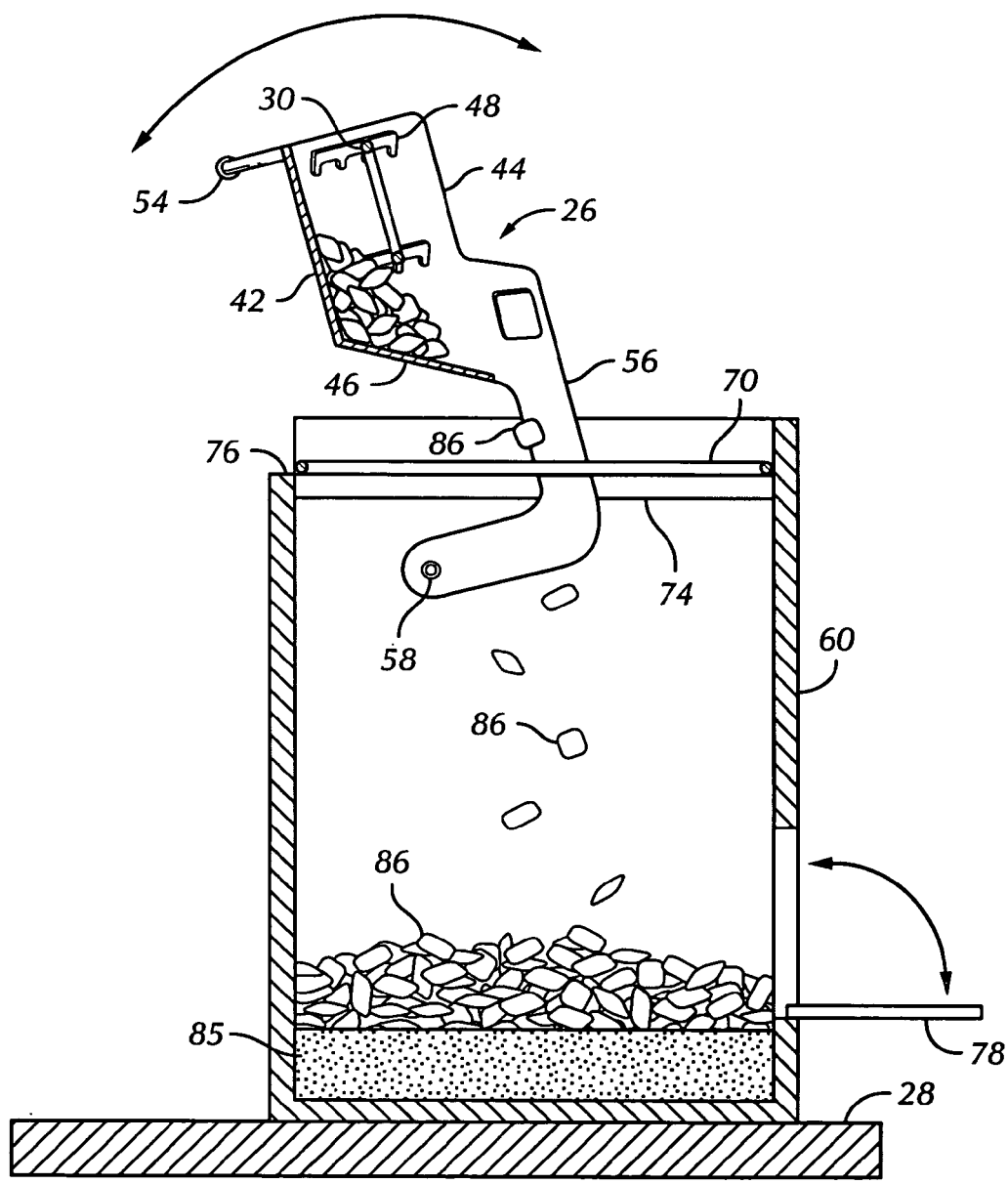
FIG. 5 is a cross sectional view taken along line 5—5 of FIG. 4, showing the grill assembly in a position intermediate the cooking position and the cleaning position, wherein debris contained in a base pan of the grill assembly falls into an ash receptacle.

Referring to the drawings, wherein like reference numerals are used to designate the same components throughout the figures, shown in FIGS. 1–6 are first and second presently preferred embodiments of a grilling apparatus having enhanced safety and convenience of operation. With particular reference to FIGS. 1–5, the first embodiment grilling apparatus 10 comprises a grill assembly 20 and an ash receptacle 60. The grill assembly 20 includes a grill rack 30 and a firebox 40. The grill assembly 20 is pivotably movable between a cooking position 22 (FIGS. 1 and 2) and a cleaning position 24 (FIGS. 3 and 4). As described in detail below herein, intermediate the cooking position 22 and the cleaning position 24, in a spill position 26, debris 86, such as spent charcoal, tends to spill from the firebox 40 into the ash receptacle 60 (FIG. 5). The ash receptacle 60 is intended for permanent installation on a generally planar supporting surface 28, typically a concrete pad.

The grill rack 30 includes a frame 32 supporting a plurality of interconnected ribs 34. The frame 32 includes handles 36 at opposing ends of the frame 32. Preferably, the handles 36 are provided with insulators 38. In the embodiment illustrated, the insulators 38 are coils of heavy wire connected at the ends of the coils to the handles 36, but spaced from the handles along the length of the coils between the coil ends.

The firebox 40 includes a base pan 42 adapted to receive a plurality of charcoal briquettes (not illustrated). Combustible fuels other than charcoal could be substituted. First and second side walls 44 extend from opposing lateral sides of the base pan 42 extending generally perpendicularly from the base pan 42. A rear wall 46 extends from a rear edge of the base pan 42, and connects to both of the side walls 44. As best illustrated in FIG. 5, the rear wall 46 is preferably inclined relative to the base pan 42, for example at an angle in the range of 10 to 20 degrees from a perpendicular orientation. Thus, when the grill assembly 20 is in the cleaning position 24, the rear wall 46 slopes from the base pan 42 downwardly from horizontal, thus encouraging debris in base pan 42 to fully empty into the ash receptacle (as described in detail below). In the cooking position 22, the base pan 42 is substantially parallel to the supporting surface 28, while in the cleaning position 24, the base pan 42 is substantially perpendicular to the supporting surface 28.

The side walls 44 each preferably include a pair of grill rack position adjustment slots 48, each slot 48 having a plurality of handle slots 50. The grill rack frame 32 may be moved within the adjustment slots 48 to be selectively positioned within corresponding handle slots 50 to place the grill rack 30 in one of a plurality of vertical support positions 52. Thus, the grill rack 30 may be moved relative to the base pan 42 to adjust the level of heat provided to food being cooked on the grill rack 30.

At least one, and preferably a pair of firebox handles 54 are connected to the base pan 42. The firebox handles 54 may be insulated (for example, in the same manner as the grill rack handles 36, as described above). The firebox handles 54 provide a user convenient points at which to grasp the grill assembly 20 when moving the grill assembly 20 between the cooking position 22 and the cleaning position 24.

The grill assembly 20 is connected to the ash receptacle 60 for pivotable movement between the cooking position 22 and the cleaning position 24 by at least one support arm 56. In the preferred embodiment illustrated in FIGS. 1–5, two support arms 56 are provided. The support arms 56 have a first end 56a and a second end 56b, the first end being 56a being connected to the firebox 40 and the second end 56b being pivotally connected to the ash receptacle 60. Preferably, the support arms 56 are attached to the ash receptacle 60 by a pin joint at a pivot point 58. The support arms 56 may be integral and unitary with the side walls 44, such that the each support arm 56 and corresponding side wall 44 are formed as a single piece. Thus, the grill assembly 20 is capable of movement relative to the ash receptacle 60 in a range of motion having a single degree of freedom (rotation), the range of motion extending from the cooking position 22 to the cleaning position 24.

The grill rack 30, firebox 40 and support arms 56 are preferably fabricated from a material such as steel, having characteristics of low cost, ease of fabrication, high strength at elevated temperature and good weather resistance. The grill rack 30 and firebox 40 are preferably assembled using conventional metal fabrication techniques such as welding.

The ash receptacle 60 has a first end 62, a second end 64, and a first opening 66 proximate the first end 62. The ash receptacle 60 is further provided with a second opening 68 proximate the second end 64. The second opening 68 allows access to ashes and other debris contained within the ash receptacle 60. The ash receptacle 60 includes a recessed edge 76 proximate the first end 66. The support arms 56 rest on the recessed edge 76 when the grill assembly 20 is in the cooking position 22. A grate 70 preferably covers the first opening 66. The grate 70 is supported by a ledge 74 extending inwardly into the first opening 66 from an interior side of walls of the ash receptacle 60. The grate 70 includes a slot 72 to accommodate movement of the firebox support arms 56. The ash receptacle 60 is preferably fabricated from heat-resistant concrete, while the grate 70 is preferably fabricated from steel.

The second opening 68 is preferably covered by a door 78 mounted to the ash receptacle 60 for movement between an open position 78a and a closed position 78b. The door 78 at least substantially covers the second opening 68 when the door 78 is in the closed position 78b. In the preferred embodiment illustrated, the door 78 is pivotally mounted to the ash receptacle 60. The door 78 is preferably provided with a lock 80. The door 78 is provided with sides 82, which help prevent inadvertent spilling of ashes during the process of cleaning the ash receptacle 60. Preferably, the door 78 is positioned above the bottom interior surface of the ash receptacle 60 (for example, by a spacing of 2 inches). This spacing allows for a preferably 2 inch thick sand "cooling" bed 85 to be installed in the bottom of the ash receptacle 60 prior to use. In FIG. 5, the door 78 has been rotated into view for the purpose of illustrating the position of the door 78 relative to the bottom interior surface of the ash receptacle 60. A debris rake 84, preferably having rearwardly extending ends, may be provided to facilitate the cleaning process. When the debris 86 is removed through the door 78, it is preferably raked from the ash receptacle 60 without disturbing or removing the sand 85.

In use, a user first moves the grill assembly 20 into the cooking position 22. In this position, no portion of the base pan 42 is positioned over the first opening 66. The user proceeds to place coals in the base pan 42, lighting the coals and grilling his or her food in the usual manner. When grilling of food is complete, the user proceeds to grasp the firebox handles 54 and rotate the grilling assembly 20 from the cooking position 22 to the cleaning position 24. The grilling assembly 20 starts in the cooking position 22 (FIG. 1) and moves through the spill position 26 (FIG. 5) and finally into the cleaning position 24 (FIG. 3). In the spill position, the base pan 42 is positioned over the first opening 66 such that contents of the base pan spill from the base pan 42 over the rear wall 46 into the ash receptacle 60 through the first opening 66 under the action of gravity. More particularly, the pivot point 58 is positioned within the first opening 66 such that the firebox 40 is positioned over the opening during the range of motion between the cooking position 22 and the cleaning position 24. Furthermore, the rear wall 46 is configured such that contents of the base pan 42 will spill into the ash receptacle when the firebox 40 is positioned over the first opening 66 in the spill position 26 (FIG. 5). Once emptied of debris 86, the grilling apparatus 20 is ready to be returned to the cooking position 22 for another cycle of use. When returned to the cooking position 22, the support arms 56 are of sufficient length to position the firebox 40 away from the first opening 66, along a side of the opening 66 and not over the first opening 66 (see FIGS. 1 and 2). The ash receptacle 60 is periodically emptied of debris 86 by personnel accessing the debris 86 via the door 78.

Figure 6:
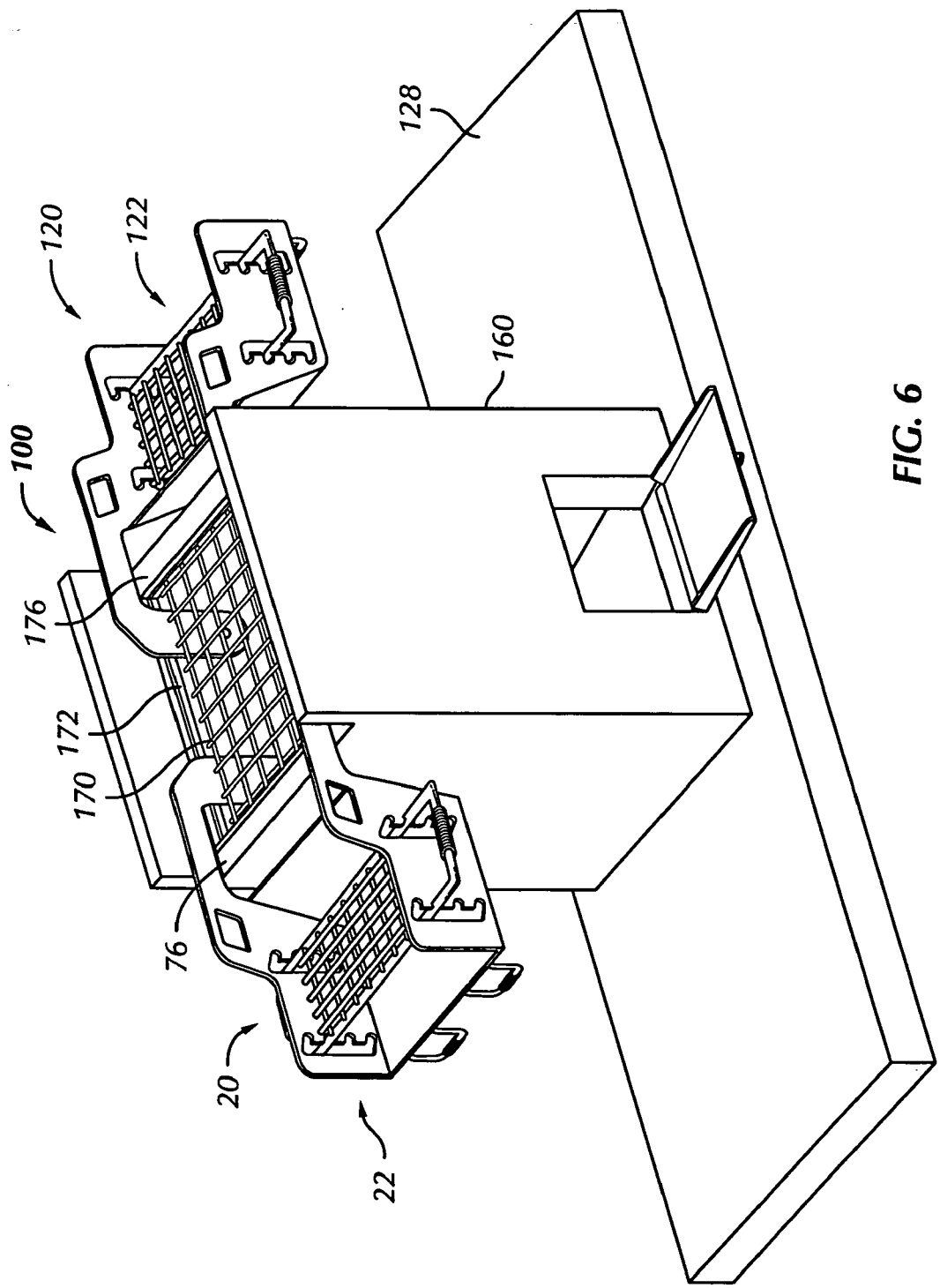
FIG. 6 is a perspective view of a grilling apparatus in accordance with a second preferred embodiment of the present invention.

With reference now to FIG. 6, the second preferred embodiment grilling apparatus 110 is constructed and operates generally similarly to the first embodiment grilling apparatus 10. In general, elements unique to the second embodiment grilling apparatus 110 are assigned reference numbers incremented by 100 above corresponding elements of the first embodiment grilling apparatus 10. Elements of the second embodiment 110 corresponding to like elements found in the first embodiment 10 are assigned the same reference numbers as in the first embodiment 10. For example, the second embodiment 110 comprises a first grilling assembly 20 corresponding to the first grilling assembly 20 of the first embodiment 10, but also comprises a second grilling assembly 120 unique to the second embodiment 110. As the structure and operation of the second embodiment grilling apparatus 110 is generally similar to the structure and operation of the first embodiment grilling apparatus 10, it is not necessary to describe the additional second embodiment 110 in further detail except to point out that the essential differences between the first and second embodiments 10, 110 include the second grilling assembly 120 and a support surface 128 of the second embodiment 110 preferably extends underneath both the first and second grill assemblies 20 and 120.

From the foregoing it can be seen that the present invention comprises a grilling apparatus comprising a grilling assembly connected to an ash receptacle for pivotal movement between a cooking position and a cleaning position to provide for quick, clean and safe disposal of spent charcoal.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention.

We claim:

1. A grilling apparatus having enhanced safety and convenience of operation comprising an ash receptacle having a first end, a second end, and a first opening proximate the first end, and a grill assembly including a firebox and at least one support arm having a first end and a second end, the first end being connected to the firebox and the second end being pivotally connected to the ash receptacle, the firebox includes a base pan and a rear wall connected to the base pan, wherein the grill assembly is pivotably movable relative to the ash receptacle between a cooking position and a cleaning position, the grill assembly having a range of motion with a single degree of freedom as the grill assembly moves between the cooking position and the cleaning position, the base pan, rear wall and at least one support arm being arranged such that contents of the base pan spill from the base pan over the rear wall and into the ash receptacle under the action of gravity only when the grill assembly is disposed over the first opening as the grill assembly moves through the range of motion.

2. The grilling apparatus of claim 1, the firebox having first and second side walls and the rear wall being connected to the side walls and the base pan, wherein the ash receptacle is supported by a generally planar supporting surface and wherein the base pan is substantially parallel to the supporting surface in the cooking position and the base pan is substantially perpendicular to the supporting surface in the cleaning position.

3. The grilling apparatus of claim 2 wherein in the cleaning position, the base pan is positioned over the first opening.

4. The grilling apparatus of claim 2 wherein in the cooking position, no portion of the base pan is positioned over the first opening.

5. The grilling apparatus of claim 2, wherein the grill assembly further includes a grill rack and a plurality of support positions in which the grill rack may be selectively placed to adjust a position of the grill rack relative to the base pan.

6. The grilling apparatus of claim 5, wherein at least one of the first and second side walls of the firebox further includes a plurality of position adjustment slots in which the grill rack may be selectively positioned, each position adjustment slot corresponding to one of the plurality of support positions.

7. The grilling apparatus of claim 1, wherein the ash receptacle further comprises a second opening proximate the second end, the second opening allowing access to ashes and other debris.

8. The grilling apparatus of claim 7 further comprising a door mounted to the ash receptacle, the door having an open position wherein the second opening is uncovered and a closed position wherein the second opening is at least substantially covered by the door.

9. The grilling apparatus of claim 8 wherein the door is pivotally mounted to the ash receptacle.

10. The grilling apparatus of claim 9 wherein the door includes a lock.

11. The grilling apparatus of claim 1, wherein the ash receptacle further comprises a grate supported by the ash receptacle and covering the first opening.

12. The grilling apparatus of claim 1 wherein the ash receptacle is fabricated from a heat-resistant concrete.

13. The grilling apparatus of claim 1 further comprising at least one handle connected to the firebox to facilitate movement of the firebox between the cooking position and the cleaning position.

14. A grilling apparatus having enhanced safety and convenience of operation comprising an ash receptacle having a first end, a second end, and an opening proximate the first end, and a grill assembly including a firebox, the grill assembly being connected to the ash receptacle for pivotal movement relative to the ash receptacle between a cooking position and a spill position, wherein in the spill position, the firebox is positioned over the first opening to allow contents of the firebox to fall into the ash receptacle through the first opening under the action of gravity and in the cooking position, the firebox is positioned along a side of the opening and not over the opening, at least one support arm connecting the grill assembly to the ash receptacle at a pivot point, the pivot point being located within the opening and the support arm having sufficient length to position the firebox along the side of the opening and not over the opening when the grilling assembly is in the cooking position.

* * * * *